United States Patent [19]

Köhler

[11] 4,100,837
[45] Jul. 18, 1978

[54] TEMPERATURE COMPENSATED MEASURING DEVICE

[75] Inventor: Walter Köhler, Gütersloh, Germany

[73] Assignee: Norte-Klessmann & Co. K.G., Gütersloh, Germany

[21] Appl. No.: 752,963

[22] Filed: Dec. 21, 1976

[30] Foreign Application Priority Data

Dec. 24, 1975 [DE] Fed. Rep. of Germany ....... 2558625

[51] Int. Cl.² .......................... B23C 7/00; B23B 49/00
[52] U.S. Cl. .................................. 90/11 R; 408/16; 73/363.3; 33/125 T
[58] Field of Search ................ 33/125 T; 408/16, 241; 82/DIG. 1; 90/11 R; 73/363.3

[56] References Cited

U.S. PATENT DOCUMENTS

| 2,376,100 | 5/1945 | Turretini | 82/DIG. 1 |
| 2,957,392 | 10/1960 | Zwick et al. | 82/DIG. 1 |
| 2,979,952 | 4/1961 | Eastman | 73/363.3 |

FOREIGN PATENT DOCUMENTS 260,182   10/1970   U.S.S.R. ............. 33/125 T

*Primary Examiner*—Gil Weidenfeld
*Attorney, Agent, or Firm*—Charles E. Baxley

[57] ABSTRACT

A machine tool is provided with a measuring device having two outer steel rods each fixed at one end to the machine casing and each connected at its free end with an aluminium rod of about the same length, the aluminium rods being joined together at their opposite ends which carry an inner steel rod having a free end fixed to which is a measuring detector in the region of the ends of the outer rods.

9 Claims, 3 Drawing Figures

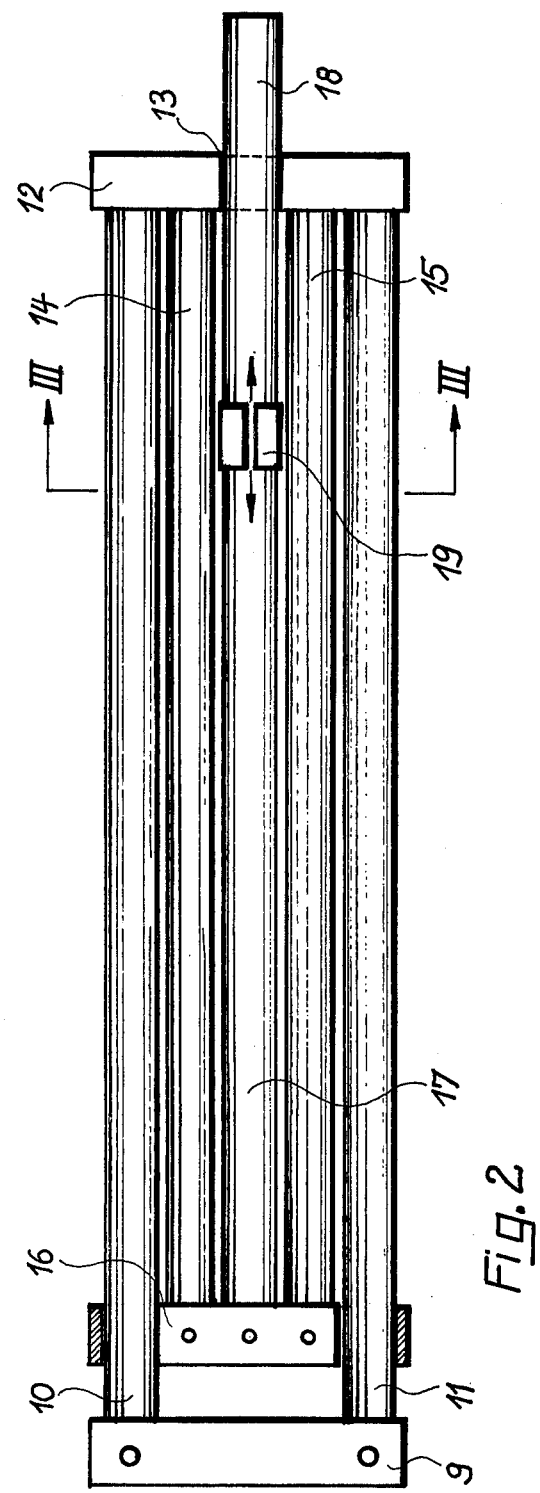
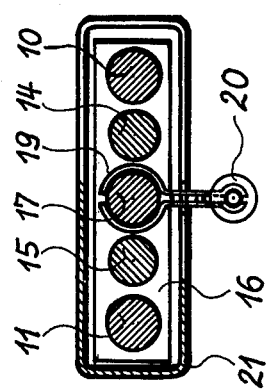

TEMPERATURE COMPENSATED MEASURING DEVICE

BACKGROUND OF THE INVENTION

This invention relates to a machine tool and more particularly to a boring or milling machine, with a measuring device for correcting the thermally-conditioned spindle displacement, which device is arranged between the spindle or its bearing and a region of the machine frame which is not influenced by the heating of the spindle.

There have been many proposals to reduce the influence of thermally-conditioned distortions in machine tools in which a very high and always constant precision is required for the machining. The chief internal sources of heat are the bearings, the gearing and the hydraulic oil, and the chief sources of external heat input are radiation heating and especially incident sunlight. To compensate such thermally-conditioned distortions, it has already been proposed to mount an expansion device in the casing of machine tools, especially for boring and milling machines, parallel to the most thermally expanding parts of the casing or parallel to those thermally expanding parts of the casing which most influence displacement of the spindle. The expansion device cooperates with a compensating expansion device and is connected to the casing by way of a connecting element such as a blade spring. With such a known arrangement, (the Deckel Company) there is achieved a compensation of the thermal expansion. However, not all the influences of temperature are compensated for. It has also already been proposed to use a measuring device of invar steel (Milwaukee-Matic), which acts on a dial gauge and an angle indicator and therewith influences the control of the machine. The use of invar rods for these has however an associated set of problems. Furthermore, since even invar steels have a thermal coefficient of expansion, a complete compensation of thermally-conditioned distortions cannot therefore be achieved.

For example, in the case of boring machines, the spindle bearing heats up when running and the casing expands. In this way inaccuracies of up to about 6/100 mm are obtained if the tool had a completely uniform temperature before the start of the operation. The heating, and thus also the expansion of the casing, comes about slowly over a long period of time. Especially in the case when bores are to be made in casings which are pre-bored and arranged in batches for final boring, the result is that the newly made bores, at the beginning of the batch, are precisely aligned when the machine is still cold but are displaced later, when the machine is warm, by up to 6/100 mm in relation to the nominal measurement.

SUMMARY OF THE INVENTION

In order to compensate in the machining for such an inaccuracy caused by the heating of the machine, there is, according to the invention, a stationary measuring point on the casing at the level of the spindle bearing. The problem with which the invention is faced is to provide such a measuring point by means of a measuring device which remains constant in length and is not influenced by any heating effect.

To solve the problem, a machine tool of the kind being discussed is provided with a measuring device consisting of an arrangement of several mutually parallel rods wherein at least one is of steel and secured to the machine and is connected at its free end to at least one rod of aluminium extending back parallel thereto. The free end of the aluminium rod is connected in the region of the point of securement, with a further steel rod at the free end of which is arranged a measuring detector which interacts with a stationary point on the machine casing.

The measuring device in particular preferably comprises two outer steel rods each fixed at one end to the machine casing and each connected at its free end with an aluminium rod of about the same length. These aluminium rods are joined together at their opposite ends, and at this junction there is fixed an inner steel rod having a free end which carries a measuring detector in the region of the ends of the outer rods. The inner steel rod preferably projects beyond the outer steel rods. According to a preferred and advantageous construction the measuring detector is adjustable by displacement on the free end of the inner steel rod and consists of a moving coil.

BRIEF DESCRIPTION OF THE DRAWING

Other objects, the features and advantages of the invention will be apparent from the following detailed description when read with the accompanying drawing which shows by way of example and not limitation the presently preferred embodiment of the invention. In the drawing:

FIG. 2 is a plan view of a thermal expansion compensating device of the invention in the form of a cluster of rods without a casing; and FIG. 3 is a section through the cluster of rods along the line III—III of FIG. 2 assuming a casing.

DESCRIPTION OF THE PREFERRED EMBODIMENT

Figure 1:
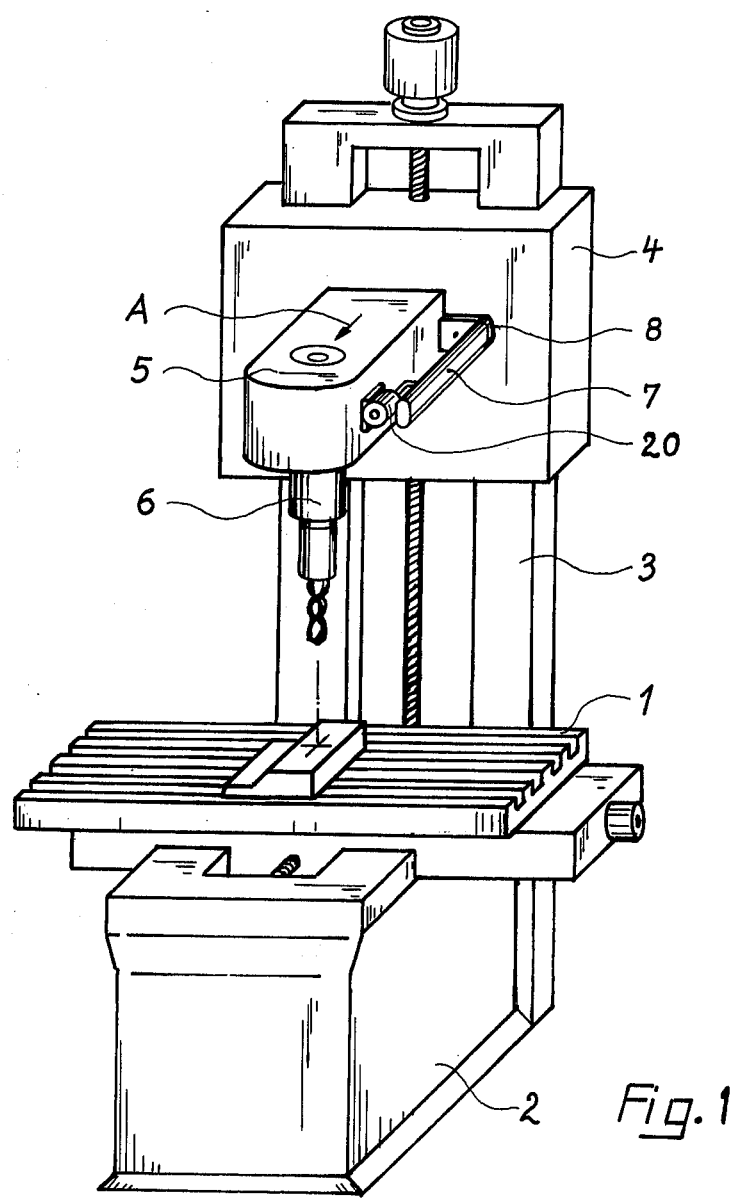
FIG. 1 is a diagrammatic perspective view of a machine tool in the form of a boring or milling machine.

The machine tool as shown in FIG. 1 has a table 1 on the stationary base 2, a guide support 3 projecting upwardly from the base 2, and an arm 5 projecting forwardly from the slide 4 with the tool spindle 6 extending outwardly from the arm 5. When the machine heats up during operation, the arm expands in the direction of the arrow A. A measuring device 7 is connected to the slide 4 and extends from the base of the arm 5 to the bearing of the spindle 6, and is parallel to the arm. Measuring device 7 is of such construction that it undergoes no thermally-conditioned expansion at all because of internal compensation between its base 8 at which it is secured and its forward end at which a preferrably displaceable measuring detector such as a moving coil device 20 is mounted.

This measuring device is shown alone in FIGS. 2 and 3. The base consists of a transverse yoke 9 on which are arranged spaced from one another two outer round bars or rods 10 and 11 of steel. These bars are fixedly secured to the yoke 9 which is in turn fixed to base 8 by means not shown. The opposite free ends the two steel bars 10 and 11 are connected with a yoke 12 which is provided centrally with a through opening 13. Inwardly of the two outer bars 10 and 11 there are fixed to connecting yoke 12 two inner bars 14 and 15 which are of the same cross section and consist of aluminium. Bars 14 and 15 of aluminium extend parallel to the bars 10 and 11 of steel back as far as the neighborhood of the base at the yoke 9 and are there joined with one another through a yoke 16. This yoke 16 preferably embraces the two outer bars 10 and 11 through appropriately designed bores, or pincer-like, but is not rigidly or fixedly connected therewith.

Between the two bars 14 and 15 of aluminium there is secured to the yoke 16 a middle bar 17 of steel which extends parallel to the aforesaid bars and projects with its free end 18 through the opening 13 in the forward yoke 12 which joins the pair of bars 10 and 11 of steel with the pair of bars 14 and 15 of aluminium. The opening 13 in the yoke 12 is formed in such a way that it surrounds the free end 18 of bar 17 but is not in constraining contact in any way therewith. Inwardly of the yoke 12 there is arranged on the bar 17 a slide 19 which is reciprocatingly displaceable and onto which is fastened a measuring detector, in the present case preferably a moving coil device 20, is arranged. Such moving coil devices are well known in the art. One particular device relies on the movement of a core between two coils to modulate an alternating signal, the amplitude of which indicates displacement.

The whole cluster of bars or rods is preferably surrounded by a casing in the form of a tube 21 of rectangular cross-section. Besides protecting the cluster of tubes mechanically and against impurities this casing has also the primary task of ensuring that heat influences are uniformly distributed over the whole cluster of bars or rods.

The heat expansion of the steel bars or rods is half as much as the heat expansion of the aluminium bars or rods, and it can be seen from FIG. 2 that, through the particular arrangement and alternation of the individual bars or rods the thermal expansion of the steel bars or rods, which is half as much, is doubled, in that two steel bars or rods are tandem joined in like direction of action, while there are arranged in the opposite direction of action the bars or rods of aluminium which have a thermal expansion twice as great as that of the steel bars or rods.

If the material of the individual bars or rods is selected in such a way that the coefficients of expansion are in the exact ratio 1:2, then at the stationary base at the yoke 9 the thermal expansion adjacent the free end 18 of the middle bar or rod 17 is fully compensated, it being possible to set the exact compensation point right by moving the slider 19 and therewith the measuring detector. The slider 19 is moved to register a null position after the device is assembled and tested at different temperatures.

The steel rods preferably consist of the steel grade St 37 K with a coefficient of heat expansion of $11.5 \times 10^{-6}$ and the aluminium rods of pure aluminium with a coefficient of heat expansion of $23.8 \times 10^{-6}$.

There has thus been shown an improved measuring device which, through a combination and particular arrangement of several rods with mutually supplementing coefficients of heat expansion, provide a reference with an aggregate heat expansion of zero with the additional possibility of correction by means of an adjustable measuring detector. The uniform influencing by heat of all of the rods is ensured by the rods being arranged very close to one another and preferably being surrounded by an external tube. The arrangement is therefore robust and scarcely susceptible to interference or trouble.

The moving coil or the otherwise constructed detector mounted thereon interacts with a counterpart which is fixed tight on the casing expanding under heat. In this way there are created measured values which are taken into account during the setting up of the workpiece for compensation in the electronically controlled drive of the table. In this way the zero setting is preferably changed contingent upon the heat expansion of the casing. As a result each fault occurring in consequence of the heat expansion of the casing is compensated.

Thus by the use of the measuring device according to the invention it is ensured that, parallel to a machine part, the heat expansion of which must be compensated, there is available a constant measuring section, the exact length of which can not be influenced in any way by the effect of heat. Thus a stationary point is transposed from the machine to the point on the machine moved in consequence of the influence of heat and the possibility is given, because of the displacement of the two points relative to one another, to carry through a compensation of the thermal expansion of the machine parts, for example with a measuring device in the form of a moving coil device.

It will be manifest that the measuring device according to the invention can be made approximately in any length without there being any need to fear modifying heat influences. The measuring device may also be arranged at any desired location on the machine at which the required room is available and undesired thermal expansions must be compensated. The particular advantage of the measuring device also consists in that the transposed fixed point can be exactly positioned and set.

While only one embodiment of the invention has been shown and described, there will now be obvious to those skilled in the art many modifications and variations satisfying many or all of the objects of the invention without departing from the spirit thereof as defined by the appended claims.

I claim:

1. A thermal compensation measuring device for positioning on an arm between a cutter spindle and frame of a machine tool comprising at least one steel rod, first means fixed to one end of said steel rod and adopted to be connected to said arm for supporting the steel rod in the direction of the arm, at least one aluminum rod, second means fixed to one end of said aluminum rod and to the other end of said steel rod, said second means supporting said aluminum rod parallel to the steel rod with its other end extending toward said one end of the steel rod, a further steel rod, third means fixed to one end of said further steel rod and to the other end of said aluminum rod, said third means supporting said further steel rod to be mutually parallel with the steel and aluminum rods with its other end extending toward said one end of the aluminum rod, and measuring means connected near the other end of said further steel rod for interacting with a stationary point on the arm of the machine tool.

2. The measuring device of claim 1 comprising a second steel rod being fixedly connected to said first and second means and being supported parallel to said one steel rod, a second aluminum rod being fixedly connected to said second and third means and being supported parallel to said one aluminum rod, both of said aluminum rods being substantially the same length as said one and said second steel rods and being located therebetween, and said further steel rod being located between the aluminum rods.

3. The measuring device according to claim 2 wherein said further steel rod projects beyond said one and second steel rods.

4. The measuring device of claim 2 wherein said second means comprises a yoke having apertures for slidingly receiving said one and said second steel rods, and said third means comprises a yoke having an aperture for slidingly receiving said further steel rod.

5. The measuring device according to claim 1 wherein the measuring device is longitudinally displaceable along said further steel rod.

6. The measuring device according to claim 1 further comprising a casing for said rods.

7. The measuring device according to claim 1 wherein the steel rods have a coefficient of thermal expansion of $11.5 \times 10^{-6}$, and the aluminium rod has a coefficient of heat expansion of $23.8 \times 10^{-6}$.

8. The measuring device according to claim 7 wherein the steel rods are of a grade of steel St 37 K and the aluminium rod is of pure aluminium.

9. A machine tool comprising: A frame; a spindle; an arm extending from said frame for supporting said spindle; a thermal compensation measuring device supported on said arm, said measuring device supported on said arm, said measuring device having at least one steel rod, first means fixed to one end of said steel rod, first means fixed to one end of said steel rod and connected to the arm for supporting the steel rod in the direction of the arm, one aluminum rod, second means fixed to one end of said aluminum rod and to the other end of said steel rod, said second means supporting said aluminum rod parallel to the steel rod with its other end extending toward said one end of the steel rod, a further steel rod, third means fixed to one end of said further steel rod and to the other end of said aluminum rod, said third means supporting said further steel rod to be mutually parallel with the steel and aluminum rods with its other end extending toward said one end of the aluminum rod, and measuring means connected near the other end of said further steel rod for interacting with a stationary point on said arm.

* * * * *

UNITED STATES PATENT AND TRADEMARK OFFICE
CERTIFICATE OF CORRECTION

PATENT NO. : 4,100,837
DATED : July 18, 1978
INVENTOR(S) : Walter Kohler

It is certified that error appears in the above-identified patent and that said Letters Patent are hereby corrected as shown below:

Column 6, lines 1 and 2, (Claim 9) delete [supported on said arm, said measuring device].

lines 3 and 4, (Claim 9) delete [, first means fixed to one end of said steel rod].

Signed and Sealed this

Thirteenth Day of February 1979

[SEAL]

Attest:

RUTH C. MASON
Attesting Officer

DONALD W. BANNER
Commissioner of Patents and Trademarks